(12) United States Patent
Sandgren et al.

(10) Patent No.: US 11,900,408 B1
(45) Date of Patent: Feb. 13, 2024

(54) PROMOTION PROCESSING SYSTEM FOR SAVING A DIGITAL PROMOTION TO A DIGITAL WALLET BASED UPON LINK BASED IMAGE DISPLAY AND RELATED METHODS

(71) Applicant: Inmar Clearing, Inc., Winston-Salem, NC (US)

(72) Inventors: Jeffrey T. Sandgren, Kernersville, NC (US); Bobbi Iacovelli, Jeannette, PA (US); Richard Polhemus, Winston-Salem, NC (US); Meggan Salmon, Wynnewood, PA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/472,872

(22) Filed: Sep. 13, 2021

(51) Int. Cl.
*G06Q 30/00* (2023.01)
*G06Q 30/0207* (2023.01)
(Continued)

(52) U.S. Cl.
CPC ..... *G06Q 30/0222* (2013.01); *G06F 16/2379* (2019.01); *G06Q 20/202* (2013.01);
(Continued)

(58) Field of Classification Search
None
See application file for complete search history.

(56) References Cited

U.S. PATENT DOCUMENTS

| 6,862,575 | B1 * | 3/2005 | Anttila | G06Q 30/0239 705/14.35 |
| 8,738,446 | B1 * | 5/2014 | L'Heureux | G06Q 30/0256 705/14.54 |

(Continued)

FOREIGN PATENT DOCUMENTS

| WO | WO-0062184 A2 * | 10/2000 | G06Q 30/02 |
| WO | WO-2013009989 A2 * | 1/2013 | G06Q 30/00 |
| WO | WO-2013120064 A1 * | 8/2013 | G06K 9/00671 |

OTHER PUBLICATIONS

Blundo, Carlo, Stelvio Cimato, and Annalisa De Bonis. "Secure e-coupons." Electronic Commerce Research 5.1 (2005): 117-139. (Year: 2005).*

*Primary Examiner* — Michael Bekerman
(74) *Attorney, Agent, or Firm* — ALLEN, DYER, DOPPELT, + GILCHRIST, P.A. Attorneys at Law (57) ABSTRACT

A promotion processing system may include a user device associated with a given user, and a promotion processing server configured to generate promotional content. The promotional content may include a link to a given image corresponding to a digital promotion. The promotion processing server may also communicate the promotional content to the user device. The user device may communicate a request to the promotion processing server for the given image based upon the link, and communicate a user identifier associated with the given user to the promotion processing server. The promotion processing server may select the given image based upon the link and the user identifier, communicate the given image to the user device for viewing (Continued)

with the promotional content, and save the corresponding digital promotion to a digital wallet associated with the given user based upon the image being displayed at the user device.

24 Claims, 4 Drawing Sheets

(51) Int. Cl.
    *G06Q 30/0238*    (2023.01)
    *G06Q 20/36*    (2012.01)
    *G06Q 20/20*    (2012.01)
    *G06F 16/23*    (2019.01)
    *G06Q 30/0211*    (2023.01)
    *H04W 4/14*    (2009.01)
    *H04L 51/42*    (2022.01)

(52) U.S. Cl.
    CPC ....... *G06Q 20/367* (2013.01); *G06Q 30/0211* (2013.01); *G06Q 30/0224* (2013.01); *G06Q 30/0238* (2013.01); *H04L 51/42* (2022.05); *H04W 4/14* (2013.01)

(56) References Cited

U.S. PATENT DOCUMENTS

| | | | |
|---|---|---|---|
| 9,361,606 B2 | 6/2016 | Hertel et al. | |
| 9,710,821 B2 | 7/2017 | Heath | |
| 10,055,749 B2* | 8/2018 | Schulz | G06Q 30/0211 |
| 2003/0149618 A1* | 8/2003 | Sender | G06Q 30/0277 |
| | | | 705/26.1 |
| 2010/0125495 A1* | 5/2010 | Smith | G06Q 30/04 |
| | | | 705/26.1 |
| 2010/0125510 A1* | 5/2010 | Smith | G06Q 20/105 |
| | | | 705/17 |
| 2012/0022944 A1* | 1/2012 | Volpi | G06Q 30/0207 |
| | | | 705/14.1 |
| 2012/0158584 A1* | 6/2012 | Behren | G06Q 20/209 |
| | | | 705/41 |
| 2013/0085804 A1* | 4/2013 | Leff | G06Q 30/0201 |
| | | | 705/7.29 |
| 2015/0112785 A1* | 4/2015 | Sharan | G06Q 30/0253 |
| | | | 705/14.23 |
| 2017/0004533 A1* | 1/2017 | Boal | G06Q 30/0241 |
| 2017/0085934 A1* | 3/2017 | Evans | H04N 21/2665 |
| 2018/0089710 A1* | 3/2018 | Fedak | G06Q 30/0226 |
| 2021/0287202 A1* | 9/2021 | Fowler | G06Q 20/3263 |
| 2022/0067697 A1* | 3/2022 | Fowler | G06Q 20/3263 |

\* cited by examiner

PROMOTION PROCESSING SYSTEM FOR SAVING A DIGITAL PROMOTION TO A DIGITAL WALLET BASED UPON LINK BASED IMAGE DISPLAY AND RELATED METHODS

TECHNICAL FIELD

The present invention relates to the field of promotion processing, and, more particularly, to digital wallets and related methods.

BACKGROUND

A promotion may be for a particular product, brand of products, or service. A promotion may include text, images, or other content to convey information about the product, brand, or service, for example, to entice a given shopper to purchase the products or services. One type of promotion is a digital promotion, for example. A digital promotion is an electronic form of promotion, and may be embodied as an email, electronic notification, and/or short messaging service (SMS) message sent from a retailer or manufacturer or brand, for example.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A promotion processing system may include a user device associated with a given user, and a promotion processing server. The promotion processing server may be configured to generate promotional content that includes a link to a given image corresponding to a digital promotion, and communicate the promotional content to the user device. The user device is configured to communicate a request to the promotion processing server for the given image based upon the link, and communicate a user identifier associated with the given user to the promotion processing server. The promotional processing server may be configured to select the given image based upon the link and the user identifier, communicate the given image to the user device for viewing with the promotional content, and save the corresponding digital promotion to a digital wallet associated with the given user based upon the image being displayed at the user device.

The promotional content may have a promotion identifier associated therewith, for example. The promotion processing server may be configured to select the given image based upon the promotion identifier, for example.

The promotion processing server may be configured to store a tracking database and update the tracking database based upon the digital promotion being stored in the digital wallet. The promotion processing server may be configured to update the tracking database based upon redemption of the digital promotion at a point-of-sale (POS) terminal, for example. The promotion processing server may be configured to determine a redemption rate for the given digital promotion based upon the tracking database and communicate the redemption rate to a remote device, for example.

The promotion processing server may be configured to determine a product purchase history for the given user based upon the user identifier and select the given image based upon the product purchase history. The promotion processing server may be configured to communicate the request to the promotion processing server for the given image based upon the promotional content being displayed at the user device, for example.

The promotion processing server may be configured to communicate the promotional content in the form of an email or short messaging service (SMS) message, for example. The user device may include a mobile wireless communications device, for example.

A method aspect is directed to a method of processing a promotion. The method may include using a promotion processing server to generate promotional content comprising a link to a given image corresponding to a digital promotion, and communicate the promotional content to a user device associated with a given user. The method may also include using the promotion processing server to receive, from the user device, a request for the given image based upon the link, and receive, from the user device, a user identifier associated with the given user. The promotion processing server may also be used to select the given image based upon the link and the user identifier, communicate the given image to the user device for viewing with the promotional content, and save the corresponding digital promotion to a digital wallet associated with the given user based upon the image being displayed at the user device.

A computer readable medium aspect is directed to a non-transitory computer readable medium for processing a promotion. The non-transitory computer readable medium includes computer executable instructions that when executed by a processor cause the processor to perform operations. The operations may include generating promotional content comprising a link to a given image corresponding to a digital promotion, and communicating the promotional content to a user device associated with a given user. The operations may also include receiving, from the user device, a request for the given image based upon the link, and receiving, from the user device, a user identifier associated with the given user. The operations may further include selecting the given image based upon the link and the user identifier, communicating the given image to the user device for viewing with the promotional content, and saving the corresponding digital promotion to a digital wallet associated with the given user based upon the image being displayed at the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
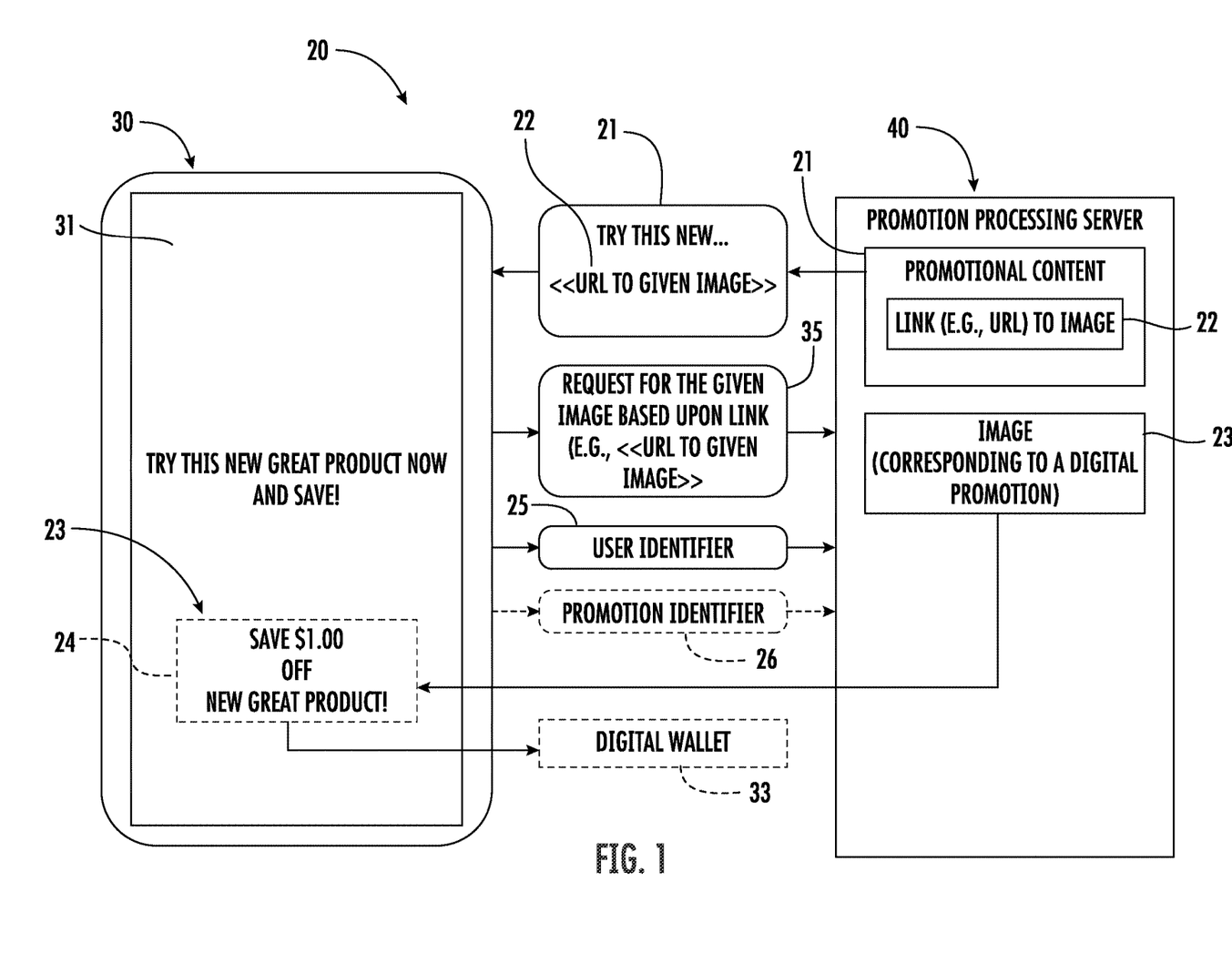
FIG. 1 is a schematic diagram of a promotion processing system according to an embodiment.
Figure 2:
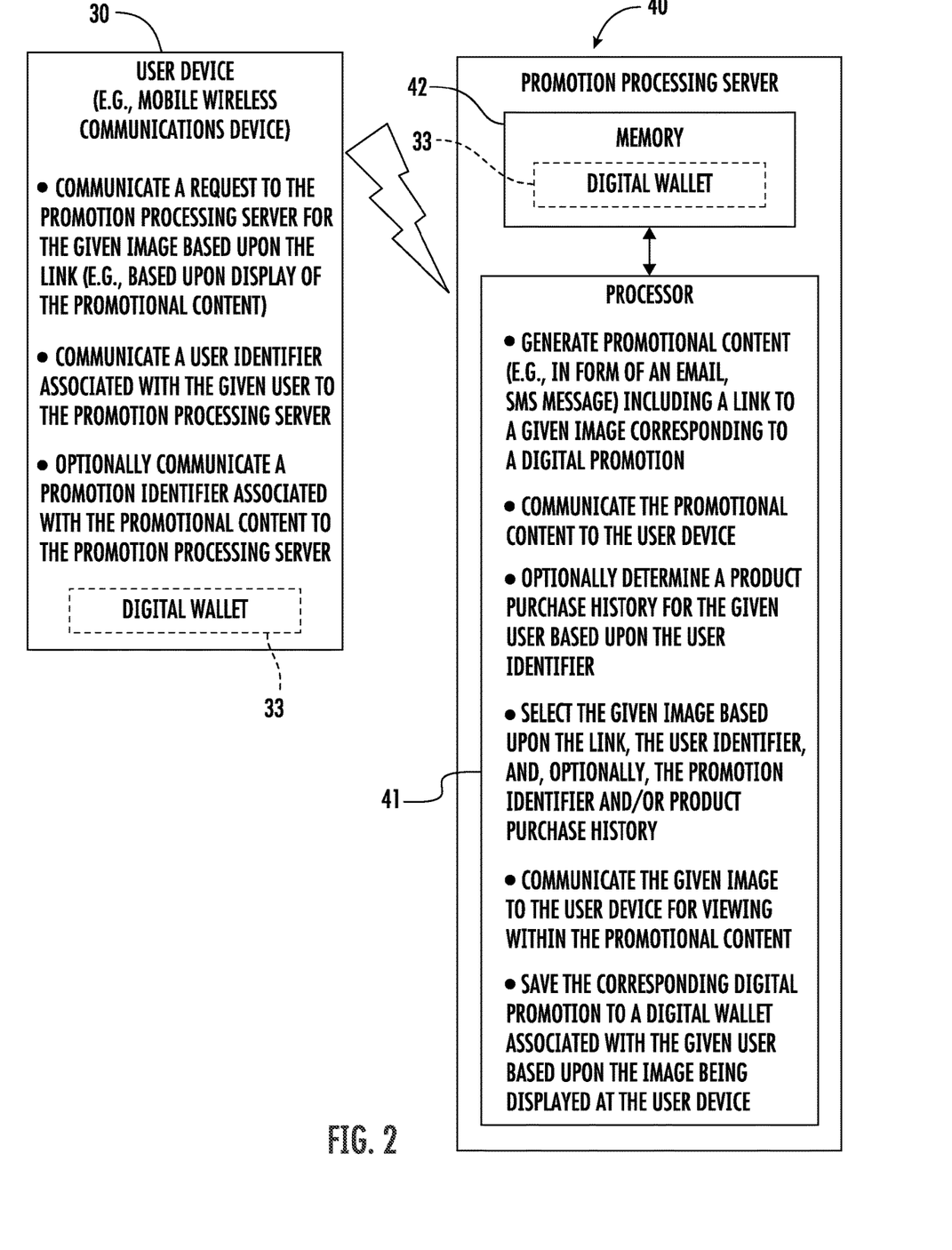
FIG. 2 is a schematic block diagram of the promotion processing system of FIG. 1.

Referring initially to FIGS. 1 and 2, a promotion processing system 20 includes a user device 30 associated with a given user. The user device 30 is illustratively in the form of a mobile wireless communications device or a smartphone. Of course, the user device 30 may be in another form, for example, a personal computer, tablet computer, or wearable device. The user device includes a display 31.

The promotion processing system 20 also includes a promotion processing server 40 that includes a processor 41 and an associated memory 42. While operations of the promotion processing server 40 are described herein it will be appreciated by those skilled in the art that the operations are performed based upon cooperation between the processor 41 and the memory 42.

Figure 3:
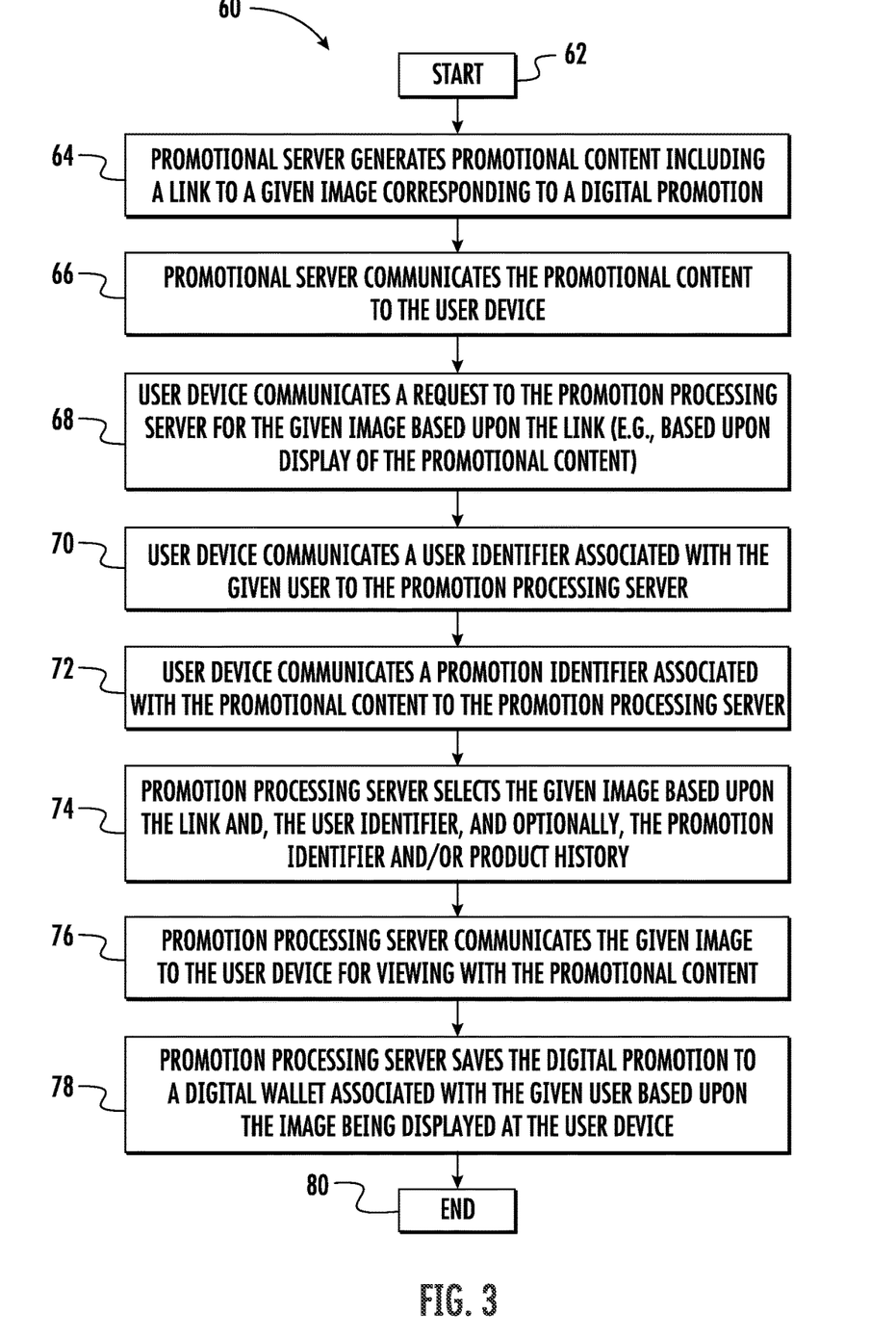
FIG. 3 is a flow diagram illustrating operation of the promotion processing system of FIG. 1.

Referring now to the flowchart 60 in FIG. 3, beginning at Block 62, further details of the promotion processing system 20 will now be described with respect to processing a promotion. At Block 64, the promotion processing server 40 generates promotional content 21 that includes a link 22 to a given image 23. The promotional content 21 may be communicated in the form of an email, SMS message, or multimedia message service (MMS) message for example. The promotional content 21 may include text, images, audio, and/or video, for example, and be associated with a given product, brand, or service. For example, the promotional content 21 may be generated to entice a given user to purchase the products, brand, or service.

The link 22, which may be a uniform resource locator (URL), is to a given image 23, for example, stored on the promotion processing server 40. In other words, the link may be embedded in the content 21 so that when the content is displayed, the image 23 that is associated with the link 22 is displayed within or as part of the content. Moreover, as will be appreciated by those skilled in the art, the link 22 permits the promotional content 21 to be dynamic in that the associated or linked image 23 may be updated by the promotion processing server 40. In other words, a different image may be associated with a static URL, for example, at different times.

The given image 23 corresponds to a digital promotion 24, for example, a digital coupon redeemable toward a particular product, brand, or service. At Block 66, the promotion processing server 40 communicates the promotional content 21 to the user device 30 including the link 22.

The user device 30, for example, upon displaying the promotional content 21 on the display 31 of the user device, communicates a request 35 to the promotion processing server 40 for the given image 23 based upon the link 22 (Block 68). As will be appreciated by those skilled in the art, the user device 30 may determine whether the promotional content 21 has been displayed on the display 31 by way of a display flag activated when the content is displayed in an active window, for example, opening of the SMS application when the promotional content is communicated by way of an SMS message, or when the email is opened (e.g., and also marked as read), for example, when the promotional content is in the form of an email.

The user device 30 also communicates a user identifier 25 associated with the given user (Block 70) and a promotion identifier 26 (Block 72) to the promotion processing server 40. The user identifier 25 and the promotion identifier 26 may also be communicated based upon display of the promotional content 21 being displayed on the display of the user device 30. The user identifier 25 may include a username, email address, phone number, loyalty account identifier, or other identifier, for example. The promotion identifier 26 may identify the promotional campaign, for example, and be used for tracking effectiveness of a given campaign and/or the campaign budget, for example.

At Block 74, the promotion processing server 40 selects the given image 23 based upon the link 22, the user identifier 25, and the promotion identifier 26. In some embodiments, the promotion processing server 40 may also select the given image 23 also based upon a product purchase history associated with the given user. For example, the promotion processing server 40 may obtain the user's product purchase history based upon the user identifier 25, or more particularly, based upon accessing a loyalty account associated with the given user based upon the user identifier. The promotion processing server 40 selects the given image corresponding to the user identifier 25 and promotion identifier 26. For example, the user identifier 25 and the promotion identifier 26 may be embedded within or part of the link 22 so that when the request 35 for the given image 23 is sent to the promotion processing server, the promotion processing server processes the link or URL extracting the user and promotion identifiers to determine or select the corresponding given image. At Block 76, the promotion processing server 40 communicates the given image 23 to the user device 30 for viewing with the promotional content 21 on the display 31.

The promotion processing server 40 cooperates, for example, with the user device 30, to save the corresponding digital promotion 24 to a digital wallet 33 associated with the given user based upon the given image being displayed on the display 31 of the user device. More particularly, the serving of the given image 23 or digital promotion 24 (i.e., image or graphic of the digital promotion) may be a trigger for the "clipping" of digital promotion to the digital wallet of the given user. The serving or communicating of the given image 23 may be considered viewing by the given user as, as described above, the given image is typically requested upon the promotional content 21 being displayed. The digital wallet 33 may be associated with the user device 30, for example, stored thereon, stored at the promotion processing server 40, for example, in the memory 42, or both the user device and the promotion processing server. The digital promotion 24 may be stored in the digital wallet 33 until redemption, for example, at a point-of-sale (POS) terminals during a purchase transaction. Operations end at Block 80.

Figure 4:
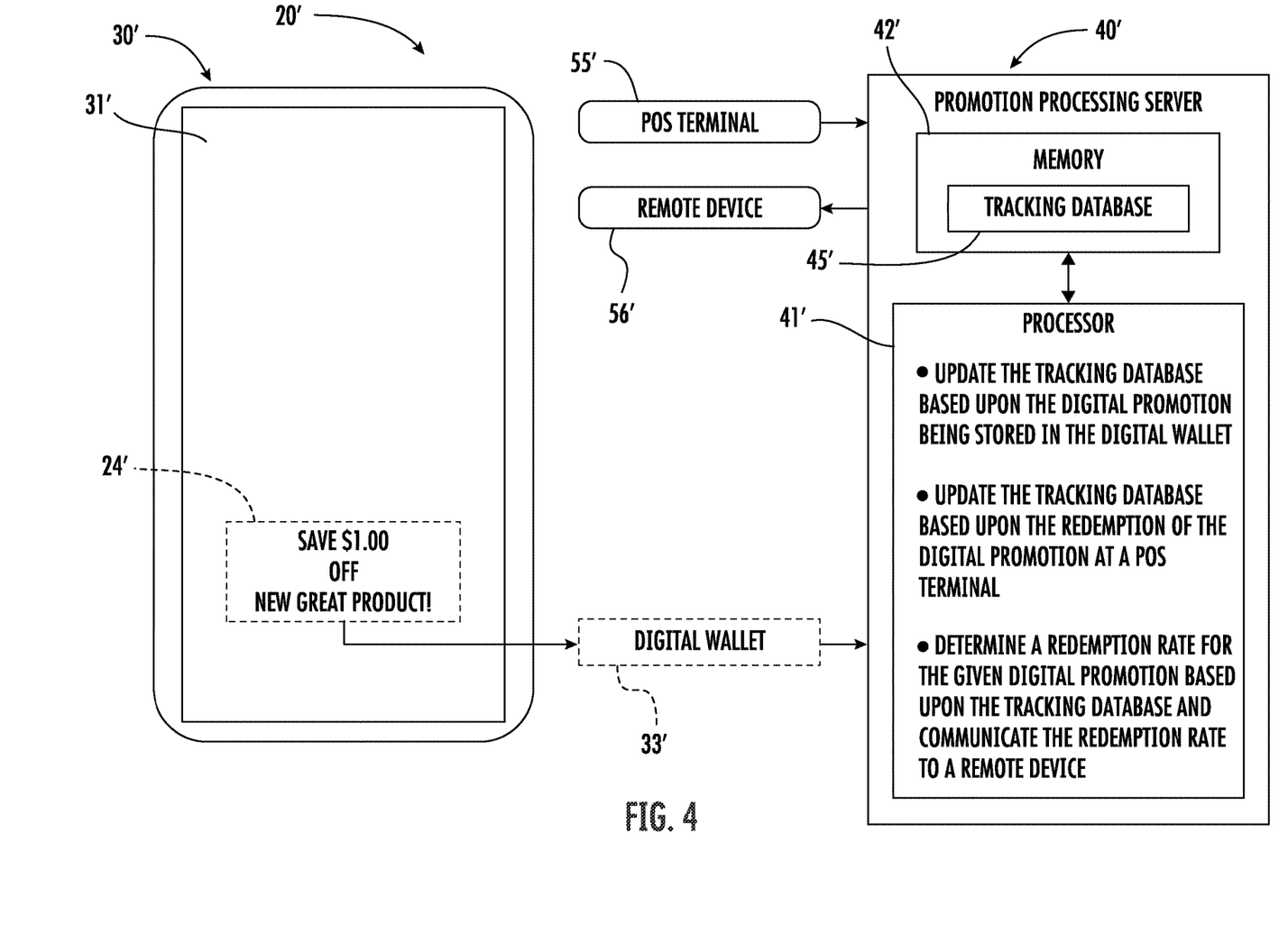
FIG. 4 is a schematic diagram of a promotion processing system in accordance with another embodiment.

Referring now to FIG. 4, in another embodiment of the promotion processing 20', the promotion processing server 40' stores a tracking database 45', for example, in the memory 42'. The promotion processing server 40', via the processor 41', updates the tracking database 45' based upon the digital promotion 24' being stored in the digital wallet 33'. More particularly, the tracking database 45' tracks the saving of the digital promotions 24' to digital wallets 33', which is thus indicative of whether the digital promotion has been displayed (i.e., viewed by the given user).

The promotion processing server 40' also updates the tracking database 45' based upon redemption of the digital promotion 24' at a POS terminal 55', for example. More particularly, when the given user redeems the digital promotion 24' stored in the digital wallet 33' at the POS terminal 55', for example, by presenting the digital promotion on the display 31' of the user device during the purchase transaction, the promotion processing server 40' tracks this redemption. The promotion processing server 40' may determine the redemption rate for the given digital promotion 24' based upon the tracking database 45'. The redemption rate for the given digital promotion 24' may be communicated to a remote device 56', for example, associated with a retailer, manufacturer, or brand. Thus, the effectiveness of a given promotional or advertising campaign may be more accurately measured.

As will be appreciated by those skilled the art, the promotion processing system 20 may conceptually be considered to include clipping-on-Arrival at a hosted coupon gallery, whereby user and promotions identifiers 25, 26 are carried in a link or URL service pattern to a user interface (UI), which then programmatically clips the digital promotion for the arriving UI site visitor or given user. The claimed embodiments advantageously are based upon, in digital delivery such as email and MMS, digitally serving of the image/message of that promotion. A user may observe this when receiving a never-before-received email campaign whereby permission is to be granted to a server to insert images into the email template before the user may actually visually see them.

As described herein, the present embodiments, serve an impression, executed by the serving of the graphic image of the savings opportunity or digital coupon into the notification vehicle (i.e., promotional content, email, SMS, etc.), which becomes the trigger for the clip or storage to the digital wallet 33. This event-triggered clipping then produces a data artifact which may be used to meaningfully determine performance of the incentive or digital coupon 24 by enabling the calculation of redemption rates based on percent of impressions served, for example.

A method aspect is directed to a method of processing a promotion. The method includes using a promotion processing server 40 to generate promotional content comprising a link 22 to a given image 23 corresponding to a digital promotion 24, and communicate the promotional content 21 to a user device 30 associated with a given user. The method also includes using the promotion processing server 40 to receive, from the user device 30, a request for the given image 23 based upon the link 22, and receive, from the user device 30, a user identifier 25 associated with the given user. The promotion processing server is also used to select the given image based upon the link 22 and the user identifier 25, communicate the given image 23 to the user device 30 for viewing with the promotional content, and save the corresponding digital promotion 24 to a digital wallet 33 associated with the given user based upon the image being displayed at the user device 30.

A computer readable medium aspect is directed to a non-transitory computer readable medium for processing a promotion. The non-transitory computer readable medium includes computer executable instructions that when executed by a processor 41 cause the processor to perform operations. The operations include generating promotional content 21 comprising a link 22 to a given image 23 corresponding to a digital promotion 24, and communicating the promotional content 21 to a user device 30 associated with a given user. The operations also include receiving, from the user device 30, a request for the given image 23 based upon the link 22, and receiving, from the user device 30, a user identifier 25 associated with the given user. The operations may further include selecting the given image 23 based upon the link 22 and the user identifier 25, communicating the given image 23 to the user device 30 for viewing with the promotional content 21, and saving the corresponding digital promotion 24 to a digital wallet 30 associated with the given user based upon the image being displayed at the user device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
   a user device associated with a given user; and
   a promotion processing server configured to
      store a plurality of images each corresponding to a digital promotion, each image having an impression count associated therewith,
      generate promotional content comprising an embedded static uniform resource locator (URL) to a given image of the plurality thereof corresponding to a digital promotion so that a different one of the plurality of images is associated with the embedded static URL at different times, the promotional content being generated by embedding the embedded static URL in the promotional content so that when the promotional content is displayed, the given image is displayed within the promotional content, and
      communicate the promotional content to the user device including the embedded static URL to the given image,
   said user device configured to
      determine whether the promotional content is being displayed on a display of the user device based upon activation of a display flag activated when the promotional content is displayed in an active display window on the display, and when so,
         communicate a request to the promotion processing server for the given image, the request including a user identifier associated with the given user and the embedded static URL to the given image;
   said promotion processing server configured to
      extract the user identifier from the request,
      select the given image based upon the embedded static URL and the user identifier,
      communicate the given image corresponding to the embedded static URL to the user device for viewing with the promotional content so that when the promotional content is displayed, the given image corresponding to the embedded static URL is displayed within the promotional content, increase the impression count for the given image based upon viewing of the given image, cooperate with the user device to save the corresponding digital promotion to a digital wallet associated with the given user based upon the image being displayed at the user device, and track saving of the corresponding digital promotion to the digital wallet upon saving the digital promotion to the digital wallet, and calculate a redemption rate for the digital promotion based upon the impression count for each of the plurality of images and the tracked saving of the digital promotion to the digital wallet.

2. The promotion processing system of claim 1 wherein the promotional content has a promotion identifier associated therewith, and wherein the promotion processing server is configured to select the given image based upon the promotion identifier.

3. The promotion processing system of claim 1 wherein the promotion processing server is configured to store a tracking database and track the saving of the digital promotion by updating the tracking database based upon the digital promotion being stored in the digital wallet.

4. The promotion processing system of claim 3 wherein the promotion processing server is configured to update the tracking database based upon redemption of the digital promotion at a point-of-sale (POS) terminal.

5. The promotion processing system of claim 3 wherein the promotion processing server is configured to determine the redemption rate for the given digital promotion based upon the tracking database and communicate the redemption rate to a remote device.

6. The promotion processing system of claim 1 wherein the promotion processing server is configured to determine a product purchase history for the given user based upon the user identifier and select the given image based upon the product purchase history.

7. The promotion processing system of claim 1 wherein the promotion processing server is configured to communicate the request to the promotion processing server for the given image based upon the promotional content being displayed at the user device.

8. The promotion processing system of claim 1 wherein the promotion processing server is configured to communicate the promotional content in the form of an email or short messaging service (SMS) message.

9. The promotion processing system of claim 1 wherein the user device comprises a mobile wireless communications device.

10. A promotion processing server comprising:
a processor and an associated memory configured to
store a plurality of images each corresponding to a digital promotion, each image having an impression count associated therewith, generate promotional content comprising an embedded static uniform resource locator (URL) to a given image of the plurality thereof corresponding to a digital promotion so that a different one of the plurality of images is associated with the embedded static URL at different times, the promotional content being generated by embedding the embedded static URL in the promotional content so that when the promotional content is displayed, the given image is displayed within the promotional content, communicate the promotional content including the embedded static URL to the given image to a user device associated with a given user, receive, from the user device, a request for the given image based upon the embedded static URL, the request including a user identifier associated with the given user and embedded static URL to the given image, and the request being received upon the user device determining that the promotional content is being displayed on a display of the user device based upon activation of a display flag activated when the promotional content is displayed in an active display window on the display, extract the user identifier from the request, select the given image based upon the embedded static URL and the user identifier, communicate the given image corresponding to the embedded static URL to the user device for viewing with the promotional content so that when the promotional content is displayed, the given image corresponding to the embedded static URL is displayed within the promotional content, increase the impression count for the given image based upon viewing of the given image, cooperate with the user device to save the corresponding digital promotion to a digital wallet associated with the given user based upon the image being displayed at the user device, and track saving of the corresponding digital promotion to the digital wallet upon saving the digital promotion to the digital wallet, and calculate a redemption rate for the digital promotion based upon the impression count for each of the plurality of images and the tracked saving of the digital promotion to the digital wallet.

11. The promotion processing server of claim 10 wherein the promotional content has a promotion identifier associated therewith, and wherein the processor is configured to select the given image based upon the promotion identifier.

12. The promotion processing server of claim 10 wherein the processor is configured to store a tracking database and track the saving of the digital promotion by updating the tracking database based upon the digital promotion being stored in the digital wallet.

13. The promotion processing server of claim 12 wherein the processor is configured to update the tracking database based upon redemption of the digital promotion at a point-of-sale (POS) terminal.

14. The promotion processing server of claim 12 wherein the processor is configured to determine the redemption rate for the given digital promotion based upon the tracking database and communicate the redemption rate to a remote device.

15. The promotion processing server of claim 10 wherein the processor is configured to determine a product purchase history for the given user based upon the user identifier and select the given image based upon the product purchase history.

16. A method of processing a promotion comprising:
using a promotion processing server to
store a plurality of images each corresponding to a digital promotion, each image having an impression count associated therewith, generate promotional content comprising an embedded static uniform resource locator (URL) to a given image of the plurality thereof corresponding to a digital promotion so that a different one of the plurality of images is associated with the embedded static URL at different times, the promotional content being generated by embedding the embedded static URL in the promotional content so that when the promotional content is displayed, the given image is displayed within the promotional content, communicate the promotional content including the embedded static URL to the given image to a user device associated with a given user, receive, from the user device, a request for the given image based upon the embedded static URL, the request including a user identifier associated with the given user and the embedded static URL to the given image, and the request being received upon the user device determining that the promotional content is being displayed on a display of the user device based upon activation of a display flag activated when the promotional content is displayed in an active display window on the display, extract the user identifier from the request, select the given image based upon the embedded static URL and the user identifier, communicate the given image corresponding to the embedded static URL to the user device for viewing with the promotional content so that when the promotional content is displayed, the given image corresponding to the embedded static URL is displayed within the promotional content, increase the impression count for the given image based upon viewing of the given image, cooperate with the user device to save the corresponding digital promotion to a digital wallet associated with the given user based upon the image being displayed at the user device, and track saving of the corresponding digital promotion to the digital wallet upon saving the digital promotion to the digital wallet, and calculate a redemption rate for the digital promotion based upon the impression count for each of the plurality of images and the tracked saving of the digital promotion to the digital wallet.

17. The method of claim 16 wherein the promotional content has a promotion identifier associated therewith, and wherein using the promotion processing server comprises using the promotion processing server to select the given image based upon the promotion identifier.

18. The method of claim 16 wherein using the promotion processing server comprises using the promotion processing server to store a tracking database and track the saving of the digital promotion by updating the tracking database based upon the digital promotion being stored in the digital wallet.

19. The method of claim 16 wherein using the promotion processing server comprises using the promotion processing server to determine the redemption rate for the given digital promotion based upon the tracking database and communicate the redemption rate to a remote device.

20. The method of claim 16 wherein using the promotion processing server comprises using the promotion processing server to determine a product purchase history for the given user based upon the user identifier and select the given image based upon the product purchase history.

21. A non-transitory computer readable medium for processing a promotion, the non-transitory computer readable medium comprising computer executable instructions that when executed by a processor cause the processor to perform operations comprising:

storing a plurality of images each corresponding to a digital promotion, each image having an impression count associated therewith;

generating promotional content comprising an embedded static uniform resource locator (URL) to a given image of the plurality thereof corresponding to a digital promotion so that a different one of the plurality of images is associated with the embedded static URL at different times, the promotional content being generated by embedding the embedded static URL in the promotional content so that when the promotional content is displayed, the given image is displayed within the promotional content;

communicating the promotional content including the embedded static URL to the given image to a user device associated with a given user;

receiving, from the user device, a request for the given image based upon the embedded static URL, the request including a user identifier associated with the given user and embedded static URL to the given image, and the request being received upon the user device determining that the promotional content is being displayed on a display of the user device based upon activation of a display flag activated when the promotional content is displayed in an active display window on the display;

extracting the user identifier from the request;

selecting the given image based upon the embedded static URL and the user identifier;

communicating the given image corresponding to the embedded static URL to the user device for viewing with the promotional content so that when the promotional content is displayed, the given image corresponding to the embedded static URL is displayed within the promotional content;

increasing the impression count for the given image based upon viewing of the given image;

cooperating with the user device to save the corresponding digital promotion to a digital wallet associated with the given user based upon the image being displayed at the user device, and tracking saving of the corresponding digital promotion to the digital wallet upon saving the digital promotion to the digital wallet; and calculating a redemption rate for the digital promotion based upon the impression count for each of the plurality of images and the tracked saving of the digital promotion to the digital wallet.

22. The non-transitory computer readable medium of claim 21 wherein the promotional content has a promotion identifier associated therewith, and wherein the operations comprise selecting the given image based upon the promotion identifier.

23. The non-transitory computer readable medium of claim 21 wherein the operations comprise storing a tracking database and tracking the saving of the digital promotion by updating the tracking database based upon the digital promotion being stored in the digital wallet.

24. The non-transitory computer readable medium of claim 21 wherein the operations comprise determining the redemption rate for the given digital promotion based upon the tracking database and communicate the redemption rate to a remote device.

* * * * *